Figure 1:
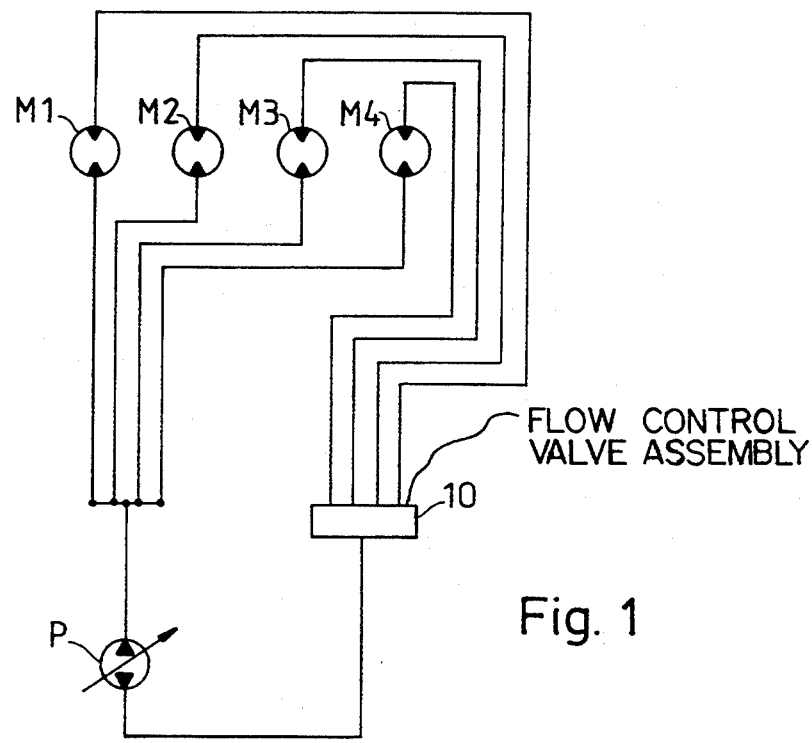

United States Patent [19]

Lindholm et al.

[11] Patent Number: 5,435,132
[45] Date of Patent: Jul. 25, 1995

[54] METHOD AND FLOW CONTROL VALVE ASSEMBLY FOR FLOW BALANCING

[76] Inventors: Jan Lindholm, Holmsveden 8; Thomas Lindholm, Kvarntäkt 17, both of Svärdsjö, Sweden, S-790 23

[21] Appl. No.: 244,089
[22] PCT Filed: Nov. 25, 1992
[86] PCT No.: PCT/SE92/00811
   § 371 Date: May 13, 1994
   § 102(e) Date: May 13, 1994
[87] PCT Pub. No.: WO93/11377
   PCT Pub. Date: Jun. 10, 1993

[30] Foreign Application Priority Data

Nov. 29, 1991 [SE] Sweden ................... 9103553

[51] Int. Cl.$^6$ ............... F16D 31/00; F16D 31/02; F15B 11/08
[52] U.S. Cl. ................... 60/327; 60/426; 91/515; 91/517; 91/518; 91/445; 91/446; 91/448; 137/111
[58] Field of Search ......... 60/327, 420, 426, 459, 60/494, 468; 91/511, 514, 515, 517, 518, 521, 445, 448, 446; 137/111, 114

[56] References Cited

U.S. PATENT DOCUMENTS

| | | |
|---|---|---|
| 2,467,576 | 4/1949 | Zimmermann . |
| 3,091,930 | 6/1963 | Thoma et al. . |
| 3,166,906 | 1/1965 | Zala . |
| 3,238,962 | 3/1966 | Read . |
| 3,355,886 | 12/1967 | Weisenbach . |
| 3,662,773 | 5/1972 | Nicolas ............... 137/111 X |
| 3,727,625 | 4/1973 | Nagumo et al. . |
| 3,908,374 | 9/1975 | Habiger . |
| 4,564,038 | 1/1986 | Kalmanczhelyi . |
| 4,564,039 | 1/1986 | Kalmanezhelyi . |
| 4,583,371 | 4/1986 | Hoashi et al. . |
| 4,756,156 | 7/1988 | Appel . |
| 4,879,945 | 11/1989 | Brunner et al. ............ 60/468 X |
| 4,986,071 | 1/1991 | Voss et al. ............ 60/420 |
| 5,182,909 | 2/1993 | Stellwagen ............ 60/426 |

FOREIGN PATENT DOCUMENTS

| | | |
|---|---|---|
| 812541 | 8/1981 | Finland . |
| 58-101870 | 6/1983 | Japan . |
| 1305381 | 1/1973 | United Kingdom . |
| 1447551 | 8/1976 | United Kingdom . |
| 587270 | 1/1978 | U.S.S.R. . |
| 1083702 | 2/1992 | U.S.S.R. ............ 91/532 |

Primary Examiner—Edward K. Look
Assistant Examiner—Hoang Nguyen
Attorney, Agent, or Firm—Young & Thompson

[57] ABSTRACT

The invention relates to a method for, in a hydrostatic transmission having a preferably variable displacement hydraulic pump (P) feeding a number of hydraulic motors (M1, M2, M3, M4) provided in association with respective drive wheels, drive tracks or corresponding drive apparatus, mutually balancing the flow of hydraulic fluid through the different hydraulic motors (M1-M4) by individually controlling of the flow from and/or to the same, whereby the individual flows of hydraulic fluid through the respective hydraulic motors (M1-M4) are detected and compared across respective restrictions (14, 15) being variable dependent on the total flow but being of mutually equal size and whereby, for optimum control or balancing, the detected differences in flow through the different hydraulic motors are in themselves used directly for the balancing.

20 Claims, 5 Drawing Sheets

METHOD AND FLOW CONTROL VALVE ASSEMBLY FOR FLOW BALANCING

The invention generally relates to hydrostatic transmissions and more specifically relates to a method and a flow control valve assembly for achieving mutual balancing of flows through consumers or working apparatuses in hydrostatic transmissions, of the kind indicated in the preambles of claims 1 and 5 respectively.

Hydrostatic transmissions of the kind indicated in the introduction are especially employed for propelling special vehicles, such as cross-country vehicles and other slow moving vehicles, whereby the drive motor, for instance a combustion engine or an electric motor, of the vehicle is employed for driving one or more hydraulic pumps which usually are of the kind having a variable displacement. The flow from the hydraulic pump/pumps drive hydraulic motors which directly or through a gear-box drives wheels or (caterpillar) tracks of the vehicle.

One problem that has to be solved in connection with such vehicles is that, on the one hand, the drive wheels or tracks of the vehicle must be permitted to rotate with different speeds, in order for the wheels or tracks to be able to cover distances of different lengths during the same time, and simultaneously must be able to transmit equal drive power, for instance when the vehicle is turning, and that, on the other hand, the drive wheels or tracks must not be allowed to slid due to a lower load or a lower coefficient of friction against the ground surface. Due to the varying nature of the ground or road surface a maximum tractive force is obtained which is equal to the number of wheels or tracks multiplied with the tractive force obtained from the wheel or track being able to transmit the lowest tractive force. By vehicles having gear-transmission this problem is solved by means of a differential gear having a differential lock which may be engaged and disengaged. The hydrostatic transmission does not require any equivalent to the differential, but in order to obtain maximum tractive force for each separate wheel or track, a mutual controlling or balancing of the hydraulic flows of the motors at the respective wheels or tracks must achieved.

An obvious solution is to provide the vehicle with a hydraulic pump feeding each hydraulic motor, but this solution is employed very seldom today due to the coherent large requirement for space, high cost and obvious control problems.

An alternative, previously known solution is to supplement the hydraulic system of the vehicle with some kind of flow regulating hydraulic component such as a flow divider or flow combiner, i.e. provided upstream and/or downstream of the hydraulic motors, and presently there are a number of different kinds of such components on the market. However, said components have the common problem that they only operate satisfactorily within a relatively narrow range of flows. At flows below this range the operation is not satisfactory and at flows exceeding this range the pressure drop across the flow regulation or control becomes unacceptably high. This means that this kind of flow control, like the differential lock in a mechanical gear-transmission has to be engaged and disengaged depending upon the driving conditions. More specifically, the flow has to be by-passed the flow control when the volumes of flow are large. This means that such a flow control system additionally has to be supplemented with further valves which make the system relatively expensive and complicated without providing for any optimum operation.

A favourable operation may however be achieved by employing proportionally controlled valves which are provided one for each hydraulic motor and which are controlled by an advanced electronic control system employing sensors on each wheel/track. Such systems do however become very complicated and very expensive and may for that reason only be a possible choice in very specific cases on advanced vehicles where the increased cost may be accepted. Moreover, such a system becomes sensitive to interferences.

Accordingly, the basic object of the invention is to provide a method and a flow control valve assembly of the kind indicated in the introduction, by means of which an automatic balancing of the flows through the different hydraulic motors is performed for obtaining an optimum tractive force for the drive means such as, for example, wheels or tracks being driven by the hydraulic motors, and this also when differences occur in the grip of the wheels or tracks against the ground surface. At the same time a sufficient difference in rotational speed for the wheels or tracks is permitted, in order to allow for for instance turning of a vehicle with maximum steering angle without any wheel or track slipping or skidding, whereby no engagement or disengagement shall be required, independent of the driving conditions.

Other, more specific objects of the invention are to provide a method and a flow control valve assembly of the indicated kind, which permit quick, fully automatic control or balancing from minimum up to maximum flows and at low pressure drops, and which permit the design of a relatively uncomplicated transmission system at a comparatively low cost, through structural simplicity, small outer dimensions and uncomplicated installation.

According to the invention, the basic object is achieved by means of a method and a flow control valve assembly of the kind indicated in the characterizing portions of the enclosed patent claims 1 and 5 respectively.

Preferable further developments of the invention are indicated in the dependent claims.

Figure 2:
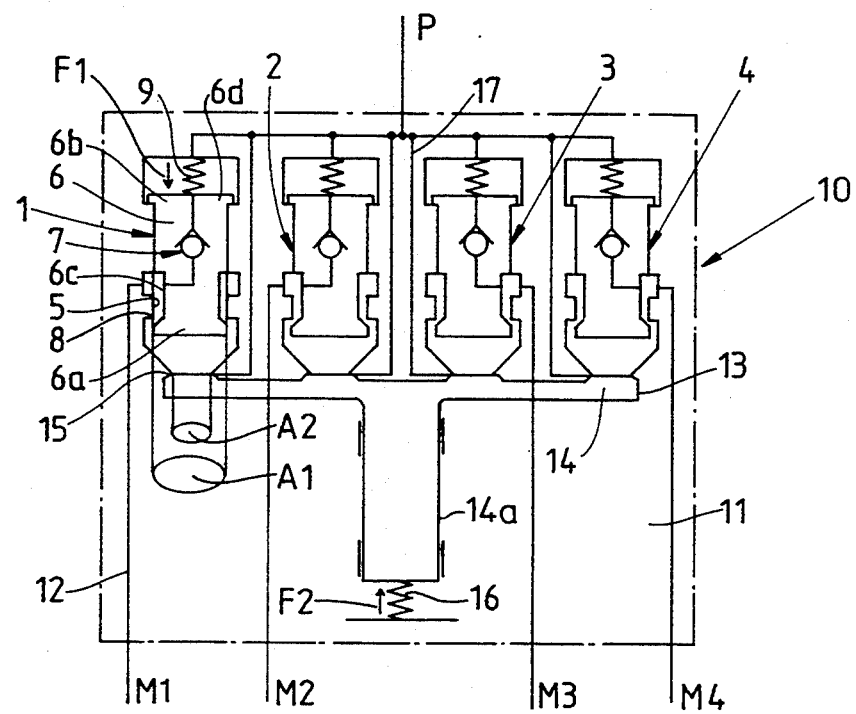
Figure 3:
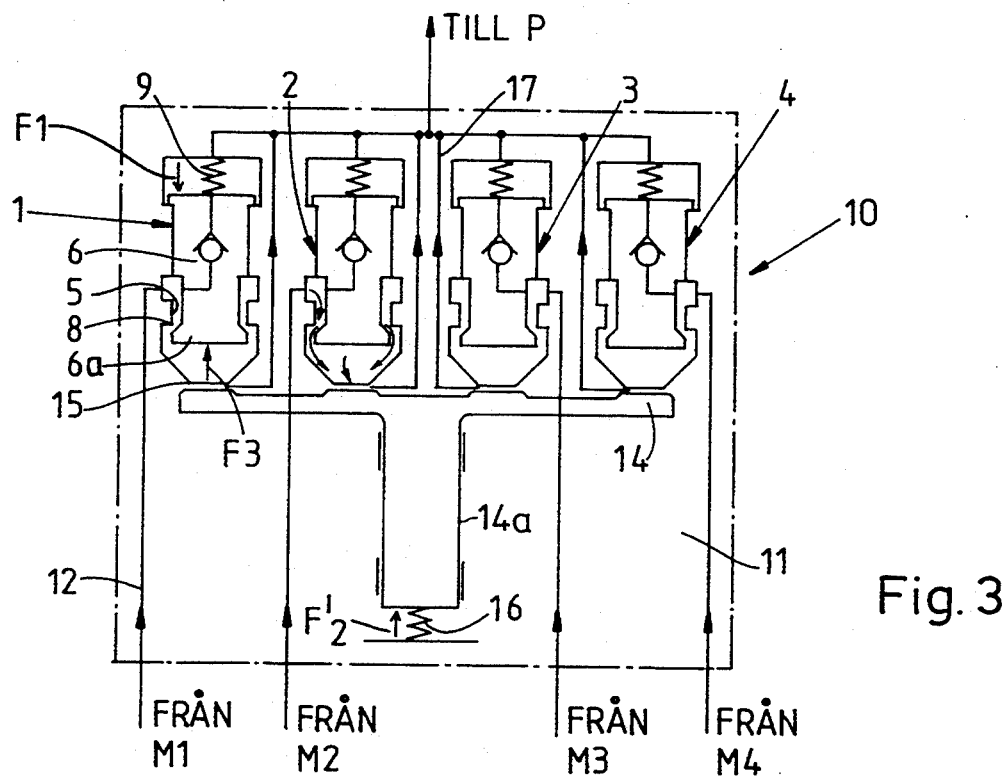
Figure 4:
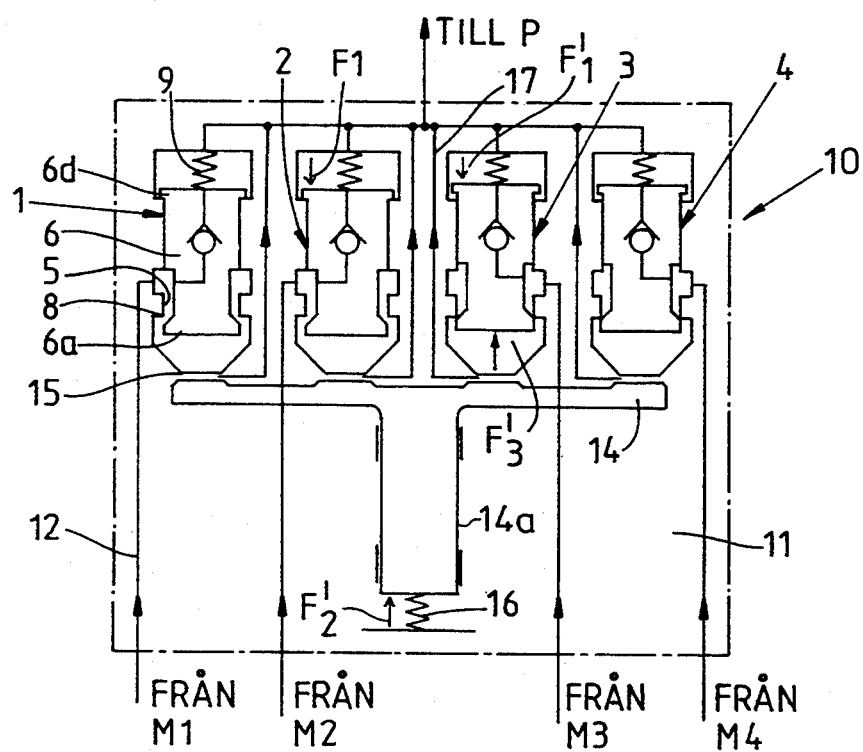
Figure 5:
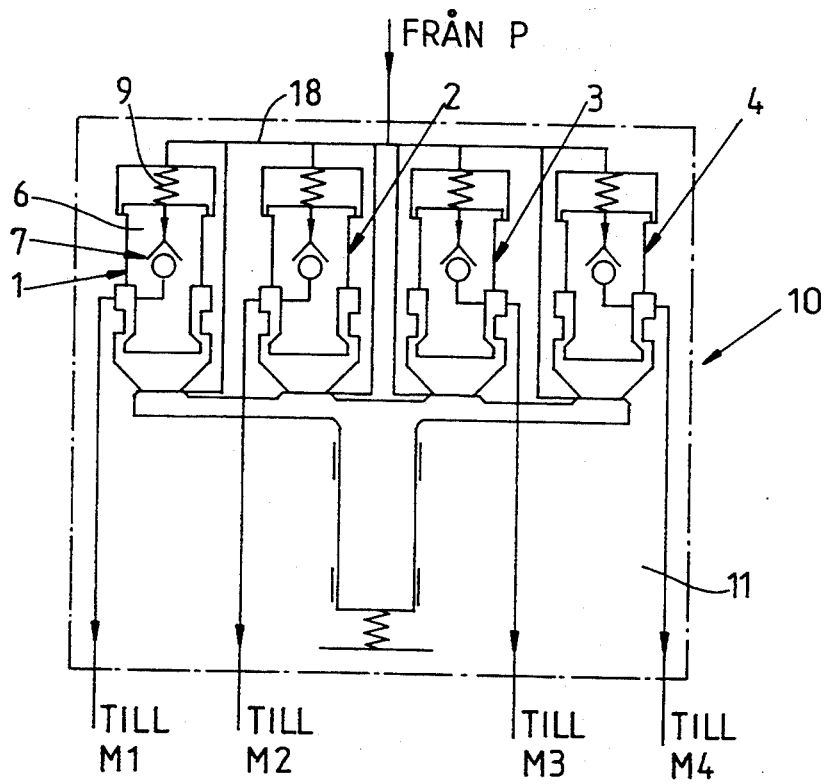
Figure 6:
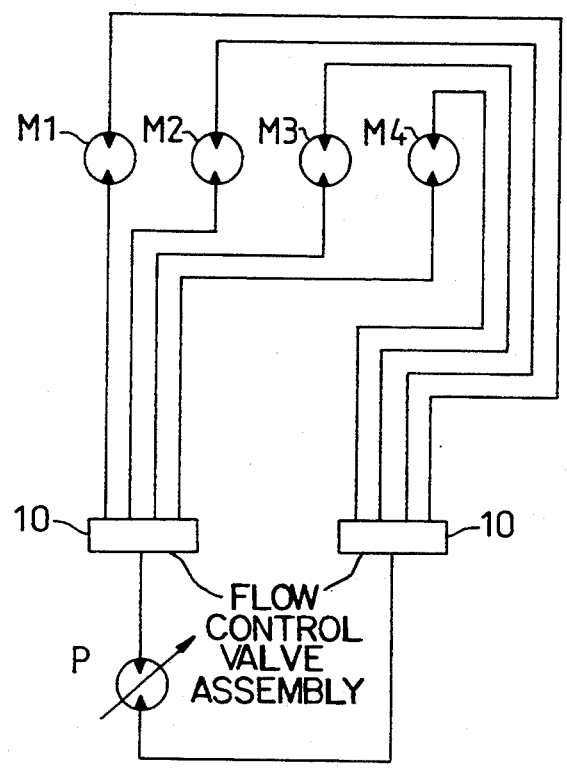

The invention will be more closely described below in connection with embodiments thereof serving as examples thereof and being illustrated in the enclosed, schematic drawings, on which:

FIG. 1 is a schematic illustration of a circuit of a hydrostatic transmission employing the principles of the invention, FIG. 2 is a schematic illustration of the principles of an embodiment of a flow control valve assembly according to the invention in its inactive condition, i.e. no flow occurs through the valve assembly, FIG. 3 is an illustration corresponding to FIG. 2, but with a flow through the valve assembly, from the motor ports to the pump port, in a normal condition when the wheels or tracks driven by the motors have substantially the same rotational speed, FIG. 4 is an illustration similar to FIGS. 2 and 3, but in a condition with a small flow or no flow at all from two of the motors, whereby the flow from the other motors is restricted in the valve assembly, i.e. illustrating a condition when two of the tracks or wheels are slipping or skidding and the remaining tracks or wheels have a better grip, FIG. 5 in an illustration corresponding to FIGS. 2–4 shows the valve assembly in a condition with flow through the assembly from the pump to the motors, FIG. 6 in a schematic illustration corresponding to FIG. 1, illustrates an example of an alternative circuit with flow balancing in both feeding directions of the pump, employing the embodiment according to FIGS. 2–5, FIGS. 7a and 7b illustrate, in a plan view from above and in a sectioned view from the side respectively, an example of a practical design of the embodiment of the flow control valve according to the invention schematically illustrated in FIGS. 2–5, and FIG. 8 schematically illustrates the principles of an alternative embodiment of the flow control valve assembly according to the invention.

The invention will be described below, with reference to a hydrostatic transmission in a vehicle provided with four drive wheels or drive tracks, but it should be emphasized that this embodiment is not to be regarded as a restriction and that the principles of the invention may also, where appropriate, be employed in connection with hydrostatic transmissions employed in other, corresponding situations where an optional number of hydraulic motors drive the corresponding number of other drive means.

The flow control valve assembly 10 according to the invention will now be described with reference primarily to the schematic illustrations of FIGS. 2–5, and in connection with the circuit schematically illustrated in FIG. 1, for a hydrostatic transmission in a not shown vehicle. Said hydrostatic transmission comprises a hydraulic pump P, preferably having a variable displacement and a reversible direction of flow, the hydraulic pump P being driven by the not illustrated engine of the vehicle and in turn feeding hydraulic fluid to four hydraulic motors M1–M4 connected in parallel and in turn driving their own wheel or track (not illustrated) for propelling the vehicle.

FIGS. 1–7 illustrate a first embodiment of the invention where the flow through the hydraulic motors is controlled by means of a flow control valve assembly 10 in the shape of a "flow combiner". Thereby, the flow through the hydraulic motors M1–M4 is controlled by means of a controlling downstream thereof, and FIG. 1 illustrates a case where controlling is performed only in one direction, i.e. by controlling the flow from the motors M1–M4 by means of a flow control valve assembly 10 provided at their outlet side with respect to the normal direction of feed of the pump P for driving the vehicle forwardly, i.e. the case when flow control or balancing is mostly desired (the explanatory diagram in FIG. 1 also applies to a "flow divider" 110 according to FIG. 8). FIG. 6 illustrates an example where two "flow combiners" are employed in the case when regulation is desired in both directions (in this case the explanatory diagram likewise applies also to two "flow dividers").

Figure 8:
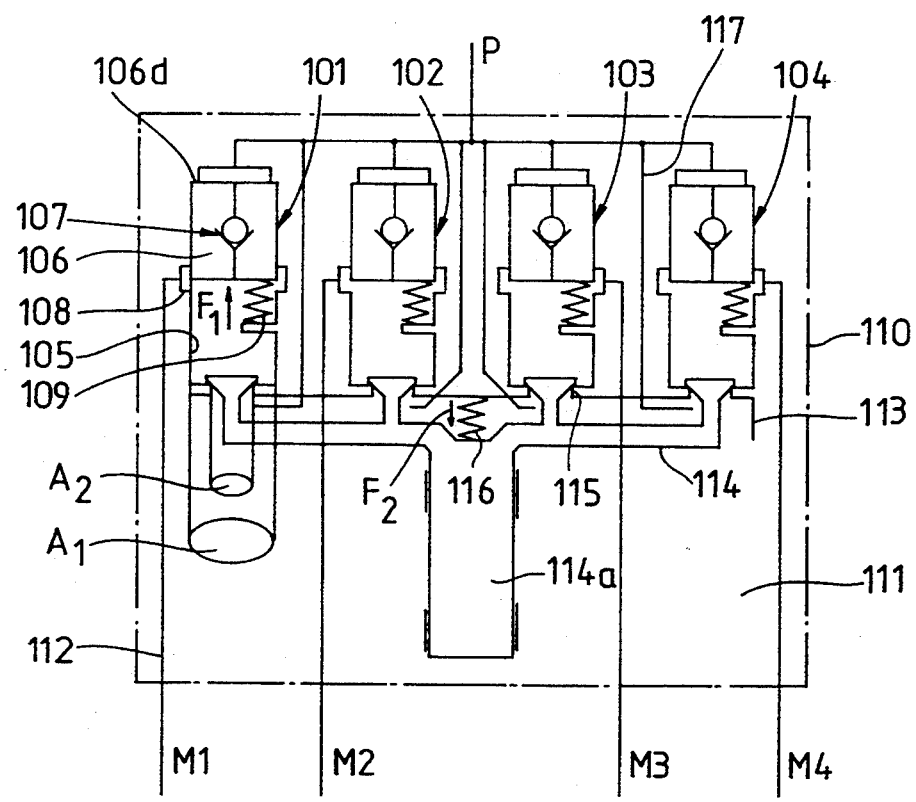

However, the invention is not restricted to a control or regulation downstream of the hydraulic motors by means of "flow combiners", and in FIG. 8 the principles of an alternative embodiment according to the invention is illustrated, with regulation or control upstream of the hydraulic motors by means of a flow control assembly 110 in the shape of a "flow divider" schematically illustrated in the drawing.

Referring now to FIGS. 2–5, the regulation of the flow of hydraulic fluid from the respective hydraulic motors M1–M4 is carried out by means of individual, but functionally cooperating flow control valves 1, 2, 3 and 4 respectively in the flow control valve assembly 10, said flow control valves 1–4 receiving the flow from the respective hydraulic motors M1–M4. Although the valves could theoretically be provided as separate valves it is advantageous to provide the flow control valves 1–4 in a common housing 11, as will be most clearly seen in connection with the embodiment of FIGS. 7a and 7b, in order to obtain an optimum design and a maximum reduction of the requirement of space, of the installation work and of the productions costs.

The flow control valves 1–4 are identical, and therefore their design will only be described with reference to the valve 1 in FIG. 2. The flow control valve 1 comprises a slide or spool 6 movable in a bore 5, having an active or work area A1 and being adapted to cooperate with a seat 8 in the bore 5 with a portion 6a thereof, in order to thereby control a restriction or throttle between the spool portion 6a and the seat 8. Moreover, the spool 6 is, at one end 6b thereof, biased by means of a spring 9 having a spring force F1. The spool is biased in a direction for displacing the spool portion 6a away from the seat 8, in order to thereby open the restriction therebetween. An inlet bore 12 provided in the housing 11, through which the flow from the associated motor M1 is conducted to the flow control valve 1, opens at a position between the spool portion 6a and the end 6b of the spool against which the spring 9 acts. In the region of the opening or orifice of the inlet bore 12 leading into the bore 5, the spool 6 is provided with a portion 6c having a reduced diameter and serving to permit fluid to flow from the inlet bore 12 into the bore 5 and past the spool portion 6a and the seat 8, in the open position of the valve 1. The spool 6 is also provided with a stop means 6d for restricting the movement of the spool in the opening-direction, as is indicated in FIG. 2.

In the embodiment illustrated in the drawings the flow control valve 1 also comprises a check valve 7 for reversing the flow without regulation or balancing, when the flow direction of the pump P is reversed. Naturally, the invention is not restricted to the provision of the check valve 7 in the spool 6, and the check valve may with the same advantage be positioned outside the actual flow control valve or may theoretically also be provided outside the flow control valve assembly 10.

At a position downstream of the seat 8 and of the spool portion 6a the bore 5 of the flow control valve 1 is in direct (FIGS. 2–5) or indirect (FIG. 7b) communication with a balancing chamber 13 (see especially FIG. 7b) in which a balancing piston 14 is displaceable, being guided (the piston rod 14a) in the housing 11. The connection between the flow control valves 1–4 and the balancing chamber 13 opens in the upper wall of the chamber 13, at seats 15. Upper surfaces of the balancing piston 14 cooperate with the seats 15 for forming a restriction therebetween which is variable dependent on the flow, and for thereby providing different pressure drops across the seats 15 when the balancing function is performed. It is thereby important that all of the seats 15 among themselves always have the same, in itself variable distance to the respective surface of the piston 14 cooperating therewith, and preferably all of the seats 15 and all of said surfaces of the piston 14 are provided in the same respective planes, perpendicular to the direction of displacement of the piston. The seats 15 are provided with an area A2. A spring 16 having the spring force F2 biases the balancing piston 14 in a direction towards the seats 15. Finally, one channel 17 (FIG. 7b) or several channels 17 (FIGS. 2-5) are extended from the balancing chamber 13 for returning the hydraulic fluid to the pump P through a port in the housing 11 of the valve assembly 10. From the return channels 17 (FIGS. 2-5) or from the balancing chamber 13 in itself (FIGS. 7a and 7b) balancing channels 18 lead to the spring side of the spools 6, on the one hand for leading the flow to the motors through the check valves 7, past the control and balancing means when the pump P is reversed, and most of all for applying the system pressure p to this side of the spools 6. Through this measure a balancing or equalization of the system pressure occurs on the opposite side of the spools 6 so that only the pressure increase upstream of the seats 15, generated by a pressure drop produced thereacross during the balancing function (described more closely below) acts to overcome the force F1 of the spring 9. Naturally, the spool 6 also has an active area A1 at the spring side.

The use of the method and flow control valve assembly 10 according to the invention provides for the function to be described below, with specific reference to FIGS. 2-5 which illustrate different conditions of the flow control valve assembly 10 during different driving conditions.

FIG. 2 illustrates the condition of the flow control valve assembly 10 when the pump P is not in operation, i.e. when no flow takes place through the valve assembly 10. In this condition all flow control valves 1-4 are moved to the completely open end position, determined by the stop means 6d at the spool 6, through the force of the springs 9: and the balancing piston 14 is biased to sealingly engage all of the seats 15 through the force of the spring 16, i.e. by appropriately guiding the balancing piston 14 in the housing 11 and by means of the firm mechanical connection between the portions of the balancing piston 14 cooperating with the corresponding seats 15, the effect is achieved that when the balancing piston 14 is displaced the same restriction or throttle area is obtained in all situations and, with equal flows through all of the motors M1-M4, the same pressure drop is obtained at all seats 15. As has been mentioned above, this naturally requires that all the different seats 15 are provided at equal distance from the respective portion of the balancing piston 14 cooperating therewith.

FIG. 3 illustrates the condition of the valve assembly 10 when hydraulic fluid from the pump P is fed through the hydraulic motors M1-M4 and to the valve assembly 10 and when the flows are equal or substantially equal through all of the hydraulic motors M1-M4, i.e. when the wheels or tracks are rotating with substantially the same speed, i.e. have the same grip against the surface. Hydraulic fluid from the respective motors M1-M4 now flows through the respective channel 12 and into the respective flow control valve 1-4, whereby the hydraulic fluid in the respective flow control valve 1-4 flows into the bore 5 externally of the spool 6, past the seat 8 and the spool portion 6a and to the seat 15. In order for hydraulic fluid to be able to flow past the seats 15 and further out through the channels 17 and back to the pump P, the balancing piston 14 has to be displaced against the spring 16 by the combined force of the hydraulic fluid flowing through all of the flow control valves 1-4.

If the system pressure is p a pressure drop Δp is thereby established across the seat 15, whereby the following relationship applies:

$$\Delta p = \frac{F2'}{n \cdot A2}$$

where n = the number of seats. In this connection it should be mentioned that although the embodiments illustrated herein employ four hydraulic motors and four associated flow control valves, the number may, as mentioned, be varied optionally within reasonable limits.

The hydraulic pressure behind the seat 15 is equal to the pressure on the spring side of the spool 6, i.e. the system pressure p, since the channels 17 communicate with the bores 5 on the spring side of the spools 6 through the balancing channels 18. The pressure increase Δp established upstream of the seat 15 multiplied with the area A1 of the spool 6 (equal to the area of the seat 8) gives rise to a force F3 acting against the spool 6 and tending to displace the same against the spring 9. In all flow control valves 1-4 the force F1 is slightly greater than or equal to the force F3 when the flow through the different valves 1-4 is substantially equal. More specifically the relationship between F1, A1 and F2, n, A2 in accordance with the above relationship, is used for determining the sensitivity of the valve assembly, i.e. if the dimensioning is such that the size of F3, determined by F2, n, A2, is equal to F1 the valve assembly becomes extremely sensible at the same time as a minimum difference in rotational speed is permitted for the wheels or tracks. On the other hand, by dimensioning such that F1 is larger than F3 an optional range is obtained where the assembly does not react to normal differences in rotational speed, for instance when negotiating curves.

By means of the restriction between the seats 15 and the balancing piston 14, said restriction being variable dependent on the flow through the flow control valves 1-4, and by appropriate adjustment of the relationship between the combined areas A2 and the spring force F2 of the spring 16, the pressure drop across the valve assembly 10 is kept at a low level from minimum and up to maximum flow through the system. Due to this fact no disengagement of the control or balancing function is required by larger flows.

FIG. 4 illustrates the flow control valve assembly 10 in the condition when the flow has descreased through any or some of the hydraulic motors M1-M4, and more specifically, in the illustrated case, when the flow through the motors M1 and M2 and accordingly through the control valves 1 and 2 is too small or is missing altogether. Since, by the flow control valve assembly 10 according to the invention, the flows from all control valves 1-4, in the normal condition cooperate to depress the balancing piston 14 against the biasing force of the spring 16, the flows through the remaining control valves 3 and 4 will, in this case with reduced or missing flow through the control valves 1 and 2, by themselves or to the principal part have to push down the balancing piston 14, which means that the pressure drop Δp' across the seats 15 of the control valves 3 and 4 becomes higher in accordance with the relationship:

$$\Delta p' = \frac{F2'}{(n - 1, 2, 3 \ldots) \cdot A2}$$

whereby the factor n−2 applies in the illustrated case where the wheels or tracks associated with the motors M3 and M4 skid and the wheels or tracks associated with the motors M1 and M2 stand still or have too low a speed. The higher pressure upstream of the seats 15 multiplied with the area A1 of the spools give rise to the force F3' which is now larger than F1', and thereby the spools 6 in the flow control valves 3 and 4 are displaced upwardly against the action of the spring 9. This means that the area or size of the restriction between the seat 8 and the spool portion 6a becomes smaller and that a pressure drop is thereby created across the restriction. The pressure drop across this restriction between the seat 8 and the spool portion 6a in the flow control valves 3 and 4 having the larger flow increases up to the point where the flow increases in the flow control valves 1 and 2—and thereby in the associated hydraulic motors M1 and M2—where it was previously too small or missing altogether, or until the flow is completely cut off at the seats 8 in the actual flow control valves 3 and 4 in question where the larger flow was previously present. The last-mentioned situation occurs if the pressure in the system rises to a maximim pressure without any flow coming through the hydraulic motors M1, M2 and flow control valves 1 and 2 where it was previously missing or was too small. Through the special design of the flow control valve assembly 10 according to the invention, with the balancing piston 14 acted upon by all flow control valves 1–4, a pressure drop will therefore only be established in the flow control valve or flow control valves associated with the motor or motors respectively the wheel or track of which skids or slips on the surface. In this situation a balancing or equalization of the hydraulic fluid flow through the whole system is established. In other words, the control adjustment of the individual flow control valves 1–4 is carried out automatically, directly dependent on differences in the flow through the different motors M1–M4 associated with the respective flow control valves 1–4, and from minimum flow up to maximum flow. More specifically, this advantageous operation is achieved by the fact that for all flow control valves 1–4 the outlet restrictions between the seat 15 and the balancing piston 14 are automatically and mutually adjusted to different, mutually equal sizes depending on one hand upon differences in flow through the separate motors, and thereby through the flow control valves, and on the other hand upon differences in the total flow through the transmission.

By correct adjustment of the spring forces of the springs 9 and 16 and of the areas of the spools 6 and the seats 15 as mentioned above, the mutual balancing or regulation of flow through the different hydraulic motors and flow control valves does not become active until the differences in flow are greater than those occurring during normal cornering, whereby the wheels or tracks in such cases are permitted to run at different speeds in order to avoid slipping or skidding within the maximum steering angle.

An example of a suitable dimensioning of areas and springs for achieving a pressure drop level of approximately 1 bar will be given below.

EXAMPLE

Spring 9 for spools:

| Dimensions: | 1,25 × 12,5 × 63,3 |
| --- | --- |
| Spring constant: | C = 1,02 N/mm |
| Clamping length: | 33 mm |
| Length with spool in closed position: | 29 mm |
| Spring force with spool in open position: | 30,9 N |

Spool area: 3,14 cm² which gives, a pressure drop when the spool begins to move: $\Delta p = 1,00$ bar a pressure drop when the spool is just closing: $\Delta p = 1,14$ bar.

Spring 16 for balancing piston:

| Dimensions: | 1,25 × 12,5 × 130 |
| --- | --- |
| Spring constant: | C = 0,69 N/mm |
| Clamping length with piston in closed position: | 73 mm |
| Length with the piston in completely open position: | 69 mm |
| Spring force with piston in closed position: | 39,33 N |

Total area at four seats 15: 4,52 cm² which gives, a produced pressure drop when the piston 14 is just starting to move by the action of four flows: $\Delta p = 0,89$ bar. Produced pressure drop when the piston 14 opens completely (maximum flow) by the action of four flows: $\Delta p = 0,95$ bar.

The difference in the pressure drop $\Delta p = 1,00$ bar required for bringing the spool to move and the pressure drop $\Delta p = 0,89$ bar to $\Delta p = 0,95$ bar which "opens" the piston from minimum flow up to maximum flow, is thus a measure of the sensitivity of the valve assembly and thereby of the area or range within which the wheels or tracks are permitted to have different rotational speeds for instance when negotiating curves, when the total flow varies from minimum up to maximum.

FIG. 5 illustrates the flow control valve assembly 10 in its condition when the direction of flow of the hydraulic pump P is reversed, whereby hydraulic fluid from the pump P flows through the flow control valves 1–4 and to the hydraulic motors M1–M4, through the check valves 7.

In the case when a flow regulation or flow balancing is desired in both directions, i.e. when driving forwardly as well as when reversing, two flow control valve assemblies 10 according to the invention are employed, as illustrated in FIG. 6.

Even though, as mentioned above, it would be theoretically possible to provide the flow control valves 1–4 independent from each other and with another type of balancing means than the balancing piston 14, this would not be any optimum solution since a corresponding function or operation would require complicated control components. Regarding the dimensions of the flow control valve assembly 10 it should also be mentioned that the valve assembly and the components therein may be provided in different shapes depending upon the actual maximum flow of the system.

Figure 7A:
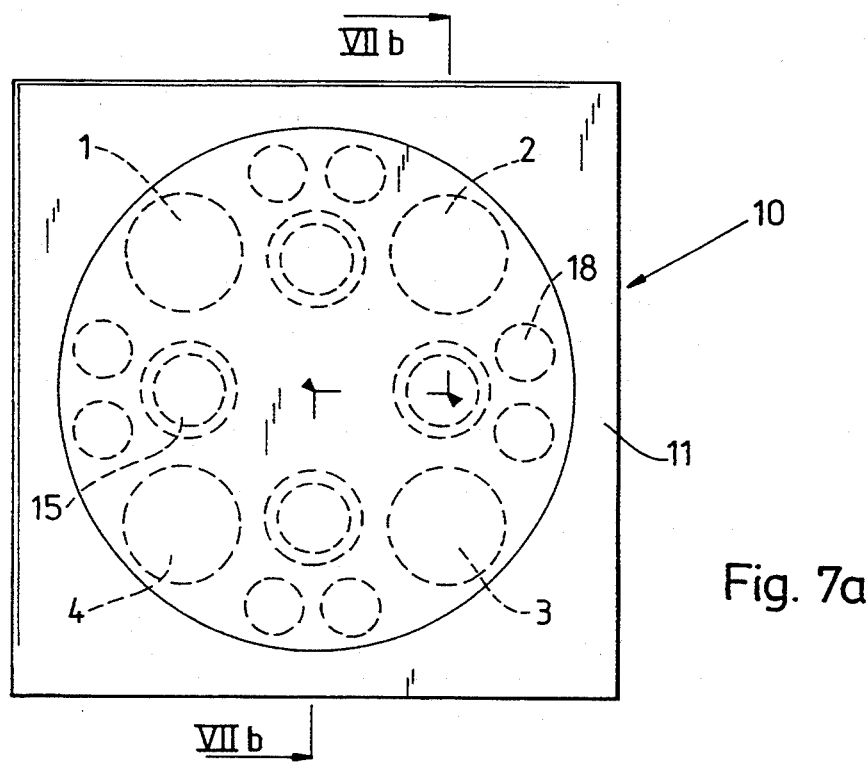
Figure 7B:
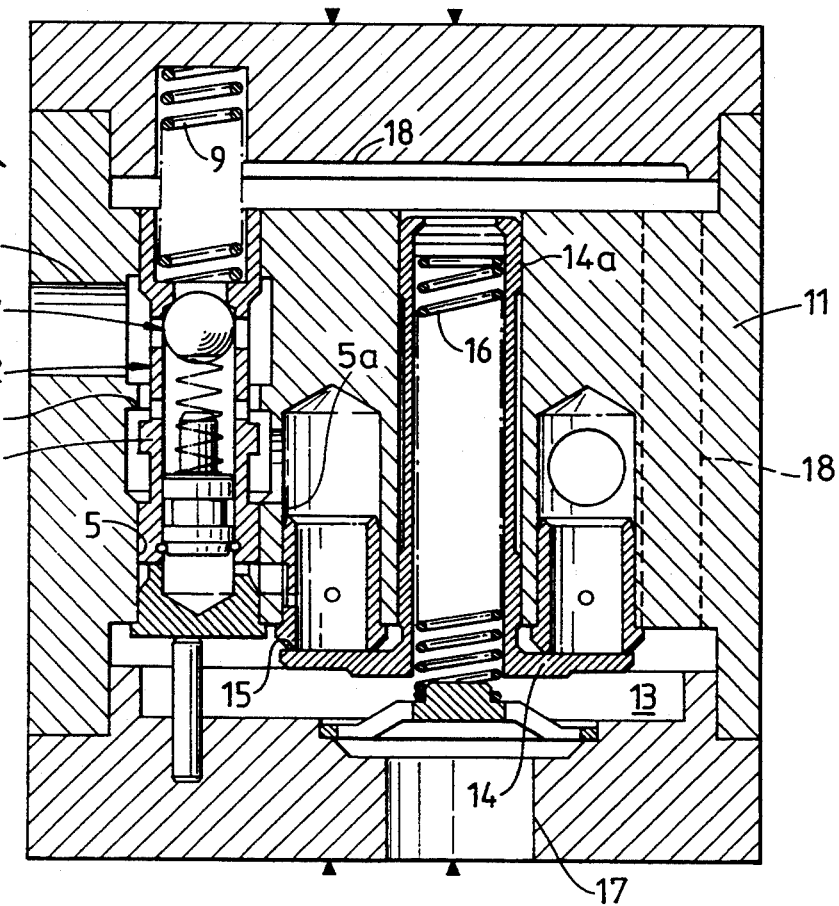

FIGS. 7a and 7b illustrate a suggested practical embodiment of the flow control valve assembly according to the invention, but it should be emphasized that this is only an example of a possible embodiment and that the valve assembly may, within the scope of the invention, be modified in many ways obvious to a man skilled in the art, within the scope of the enclosed patent claims and for achieving the operation at which the invention is aiming.

In FIGS. 7a and 7b the components of the valve assembly 10 have been provided with the same reference numerals as in FIGS. 2-5, and only some practical differences are to be explained here. Although, for reasons of clarity, the flow control valves 1-4 are in FIGS. 2-5 illustrated in a row side by side, it is preferable in the practical embodiment, at least in the case with four flow control valves 1-4, to provide these distributed with their centres on a circle having its centre in the central axis (FIG. 7a) of the housing 11. In this embodiment the bore 5 of the flow control valves 1-4 is furthermore not communicating directly with the balancing chamber 15 but through an outlet bore 5a which is connected thereto, which is parallel to the bore 5 and in which a bushing is inserted which forms the seat 15, as is illustrated in FIG. 7b. Finally, in this embodiment the balancing piston 14 is provided upside-down in the housing 11 as compared to the embodiment of FIGS. 2-5, with the piston rod facing upwardly and receiving the spring 16 being provided with one of its ends supported on the upper end of the piston rod and with its other end supported on the bottom of the balancing chamber 13, whereby the flow control valve assembly 10 may be built even more compact, i.e. significantly shorter in the direction of movement of the spools 6 and of the piston 14. Furthermore, the outlet of the balancing chamber 13 to the pump connection, i.e. corresponding to the bore 17 in the embodiment according to FIGS. 2-5, is provided centrally through the housing 11, below the piston 14 in FIG. 7b. Due to the fact that the bore 5 does not communicate directly with the balancing chamber 13 in this embodiment, the stop means for restricting the downward movement of the spool 6 may in this case be formed by the bottom of the bore 5.

It has been mentioned above that the principles of the present invention may, with the same advantage, be employed for balanced or regulated flow division between different hydraulic motors in a hydrostatic transmission, whereby FIG. 8 illustrates a basic design of a flow control valve assembly 110 in the shape of a "flow divider", according to the invention. In FIG. 8 the parts of a flow control valve assembly 110 corresponding to the parts of the flow control valve assembly 10 according to FIGS. 2-5 have been given the same reference numerals plus 100.

The flow control valve assembly 110 illustrated in FIG. 8 has the same basic design as the flow control valve assembly 10 according to FIG. 2, whereby the differences are that the balancing piston 114, through the spring 116, and the spool 106, through the spring 109, are biased in opposite directions as compared to the corresponding components in the flow control valve assembly 10, and in that the check valve 107 is reversed in order to conduct the flow from the motors M1-M4 to the pump P without balancing.

When the flow divider 110 performs its balancing function the hydraulic fluid is conducted from the pump P through the channels 117 and to the balancing chamber 113. By substantially equal flow through the hydraulic motors M1-M4 the balancing piston 114 is moved upwardly, counteracting the spring 116, by the combined force of the hydraulic fluid flowing past the seats 115 and into the flow control valves 101-104. In this case the pressure drop established across the seats 115 gives rise to a decrease in pressure in the flow control valves 101-104, whereby, when the flow is substantially equal through the flow control valves, the springs 109 and 116 and the areas A1 and A2 are so dimensioned that the force of the spring 109 and the force of the hydraulic pressure acting on the same side of the spool 106 are sufficient to hold the spool 106 in a completely open position, counteracting the system pressure p at the opposite side of the spool 106.

When the flow through one or some of the hydraulic motors M1-M4 has decreased or stopped completely the pressure drop across the seats 115 associated with the hydraulic motors having the larger flow increases as before, since the flow through these hydraulic motors alone or to the principal part shall push up the balancing piston 114. By means of the higher pressure drop the decrease in pressure $\Delta p$ in the corresponding flow control valves will become larger, corresponding to the above relationship described in connection with the first embodiment, which in turn means that the spring 109 and the hydraulic pressure $p-\Delta p$ cooperating therewith will no longer be sufficient to counteract the system pressure p on the other side of the spool 106, whereby the flow, as before, will be restricted in the flow control valves having the larger flow, until the flow increases in the flow control valves where the flow was earlier too small or missing altogether.

It is made clear by the above brief description that the principles of this flow divider are the same as those of the embodiment concerning the flow combiner, except that in the flow divider the decrease in pressure $\Delta p$ downstream of the seat 115 is employed instead of the increase in pressure before the seat 15, for controlling the flow control valves. This means that the same fundamental relationships may be used when dimensioning the different parts of the flow control valve assembly, i.e. the springs and the areas.

Finally, it should also be mentioned that in an advantageous further development a flow combiner 10 and a flow divider 110 according to the invention may preferably be combined, in a not illustrated manner, in one and the same housing and in fluidum communication with each other. Hereby the check valves 7 and 107 become superfluous since the flow control valves take over their function, and moreover the number of spools may be reduced to half since the same spool is employed in the "flow divider" and in the "flow combiner". In this manner the system may be designed extremely compact.

The above specification clarifies that the basic features of the present invention are that the individual flows through the different hydraulic motors are detected and compared across the respective restrictions which are variable depending upon the total flow but which are mutually of equal size, and that, for optimum balancing or control, the measured, different flows through the different hydraulic motors are in themselves used for the balancing. In the specification, examples have been given of how and by means of what type of valve assembly this balancing or controlling may be carried out in practice, but it is obvious that the method and valve assembly according to the invention may be modified within the scope of the enclosed patent claims by men skilled in the art, without departing from the invention.

We claim:

1. A method of, in a hydrostatic transmission having a hydraulic pump (P) feeding a number of hydraulic motors (M1, M2, M3, M4) provided in association with respective drive means, mutually balancing flow of hydraulic fluid through the different hydraulic motors (M1-M4) by individually controlling of the flow relative to the hydraulic motors, characterized in that the individual flows of hydraulic fluid through the respective hydraulic motors (M1-M4) are detected and compared across respective restrictions (14, 15; 114, 115) being variable dependent on total flow but being of mutually equal size, and in that, for optimum control or balancing, detected differences in flow through the different hydraulic motors are in themselves employed directly for the balancing.

2. The method according to claim 1, characterized in that the balancing of the flows is performed by means of individual flow control valves associated with the respective hydraulic motors (M1-M4) and in that the control adjustment of the individual flow control valves (1-4; 101-104) is carried out automatically dependent on different pressure drops, corresponding to the detected differences in flow through the difference hydraulic motors (M1-M4), established across the respective restrictions (14, 15; 114, 115).

3. The method according to claim 2, by combining flows from the hydraulic motors (M1-M4) downstream thereof, characterized in that the detection of differences in flow through the different hydraulic motors (M1-M4) is carried out by means of the restrictions (14, 15) in connection with outlets from the flow control valves (1-4), whereby, by differences in flow through the separate motors (M1-M4), an increase in pressure created by the pressure drop upstream of the restriction or restrictions (14, 15) associated with a larger flow, is employed directly for the control adjustment of the associated flow control valve or flow control valves (1-4) and thereby for the balancing of the flows.

4. The method according to claim 2, by dividing the flows from the hydraulic motors (M1-M4) upstream thereof, characterized in that the detection of differences in flow through the different hydraulic motors (M1-M4) is carried out by means of the restrictions (114, 115) in connection with the inlets to the flow control valves (101-104), whereby, by differences in flow through the separate motors (M1-M4), a decrease in pressure created by the pressure drop downstream of the restriction or restrictions (114, 115) associated with a larger flow is employed directly for the control adjustment of the associated flow control valve or flow control valves (101-104) and thereby for the balancing of the flows.

5. A flow control valve assembly for connection to a hydrostatic transmission having a hydraulic pump (P) feeding a number of hydraulic motors (M1-M4) provided in association with respective drive means, whereby the flow control assembly (10; 110) comprises means (1, 2, 3, 4; 101, 102, 103, 104) for individually controlling flow through the hydraulic motors (M1-M4) and for balancing the flows, characterized in that the flow control valve assembly (10; 110) comprises detecting means (14, 15, 16; 114, 115, 116) in a shape of restrictions (14, 15; 114, 115) being variable dependent on total flow but being of mutually equal size and intended for detecting and comparing the flow of hydraulic fluid through the respective hydraulic motors (M1-M4), and comprises flow control valves (1-4; 101-104) being functionally connected to the flow detecting means (14, 15, 16; 114, 115, 116) for automatic control adjustment of the individual flow control valves (1-4; 101-104) dependent on differences in flow through the different hydraulic motors (M1-M4) detected by the flow detecting means.

6. A flow control valve assembly according to claim 5, characterized in that the flow detection means consist of seats (15; 115) which in an embodiment as a flow combiner (10) are provided downstream of the respective flow control valves (1-4), or alternatively, in an embodiment as a flow divider, are provided upstream of the respective flow control valve (101-104), and which in cooperation with a balancing piston (14; 114) common to all of the flow control valves and biased in a direction towards the seats (15; 115) by a spring (16; 116), from the restrictions which are of equal size for all of the flow control valves (1-4; 101-104) and which are variable dependent on the total flow.

7. A flow control valve assembly according to claim 5, characterized in that the flow control valves (1-4; 101-104) comprise control adjustment means (8, 6; 108, 106) which consist of a spool (6; 106) displaceable in a bore (5; 105) and cooperating with a seat (8; 108) formed at the bore, for controlling the flow through the respective flow control valve (1-4; 101-104), in that the spool (6; 106) is biased by means of a spring (9; 109) in a direction for displacing the spool to a position corresponding to a completely open flow control valve and in that balancing channels (18; 118) are provided which, in an embodiment as a flow combiner (10) conduct the hydraulic fluid downstream of a balancing piston (14) to the spring side of the spools (6) or, alternatively, in an embodiment as a flow divider (110), conduct the hydraulic fluid upstream of the balancing piston (114) to the side of the spools (106) opposite the spring (109).

8. A flow control valve assembly according to claim 5, characterized in that the flow control valves (1-4; 101-104) together with the associated flow detection means (14, 15, 16; 114, 115, 116) are provided in a common housing (11; 111).

9. A flow control valve assembly according to claim 5, characterized in that the flow control valve assembly (10; 110) comprises check valves (7; 107) for permitting a free flow of hydraulic fluid therethrough without regulation, in a direction opposite to a feeding direction of the pump (P) in which a balancing is desired.

10. A flow control valve assembly according to claim 5, characterized in that a flow divider (110) provided upstream of the respective flow control valve and a flow combiner (10) provided downstream of the respective flow control valve are provided in one and the same housing, in fluid communication with each other.

11. A flow control valve assembly according to claim 6, characterized in that the flow control valves (1-4; 101-104) comprise control adjustment means (8, 6; 108, 106) which consist of a spool (6; 106) displaceable in a bore (5; 105) and co-operating with a seat (8; 108) formed at the bore, for controlling the flow through the respective flow control valve (1-4; 101-104), in that the spool (6; 106) is biased by means of a spring (9; 109) in a direction for displacing the spool to a position corresponding to a completely open flow control valve and in that balancing channels (18; 118) are provided which, in the embodiment as a flow combiner (10) conduct the hydraulic fluid downstream of the balancing piston (14) to the spring side of the spools (6) or, alternatively, in an embodiment as the flow divider (110), conduct the hydraulic fluid upstream of the balancing piston (114) to the side of the spools (106) opposite the spring (109).

12. A flow control valve assembly according to claim 6, characterized in that the flow control valves (1-4;

101–104) together with the associated flow detection means (14, 15, 16; 114, 115, 116) are provided in a common housing (11; 111).

13. A flow control valve assembly according to claim 7, characterized in that the flow control valves (1-4; 101-104) together with the associated flow detection means (14, 15, 16; 114, 115, 116) are provided in a common housing (11; 111).

14. A flow control valve assembly according to claim 6, characterized in that the flow control valve assembly (10; 110) comprises check valves (7; 107) for permitting a free flow of hydraulic fluid therethrough without regulation, in a direction opposite to a feeding direction of the pump (P) in which a balancing is desired.

15. A flow control valve assembly according to claim 7, characterized in that the flow control valve assembly (10; 110) comprises check valves (7; 107) for permitting a free flow of hydraulic fluid therethrough without regulation, in a direction opposite to a feeding direction of the pump (P) in which a balancing is desired.

16. A flow control valve assembly according to claim 8, characterized in that the flow control valve assembly (10; 110) comprises check valves (7; 107) for permitting a free flow of hydraulic fluid therethrough without regulation, in a direction opposite to a feeding direction of the pump (P) in which a balancing is desired.

17. A flow control valve assembly according to claim 6, characterized in that the flow divider (110) and the flow combiner (10) are provided in one and the same housing, in fluid communication with each other.

18. A flow control valve assembly according to claim 7, characterized in that the flow divider (110) and the flow combiner (10) are provided in one and the same housing, in fluid communication with each other.

19. A flow control valve assembly according to claim 8, characterized in that a flow divider (110) provided upstream of the respective flow control valve and a flow combiner (10) provided downstream of the respective flow control valve are provided in the common housing, in fluid communication with each other.

20. A flow control valve assembly according to claim 9, characterized in that a flow divider (110) provided upstream of the respective flow control valve and a flow combiner (10) provided downstream of the respective flow control valve are provided in one and the same housing, in fluid communication with each other.

* * * * *